United States Patent
Sahlsten et al.

(10) Patent No.: US 9,710,887 B1
(45) Date of Patent: *Jul. 18, 2017

(54) DISPLAY APPARATUS AND METHOD OF DISPLAYING USING CONTEXT DISPLAY AND PROJECTORS

(71) Applicant: Varjo Technologies Oy, Helsinki (FI)

(72) Inventors: Oiva Arvo Oskari Sahlsten, Salo (FI); Urho Konttori, Helsinki (FI); Klaus Melakari, Oulu (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,973

(22) Filed: Dec. 8, 2016

Related U.S. Application Data

(63) Continuation of application No. 15/366,424, filed on Dec. 1, 2016, and a continuation of application No. 15/366,497, filed on Dec. 1, 2016.

(51) Int. Cl.
| | | |
|---|---|---|
| G09G 1/00 | (2006.01) | |
| G06T 3/40 | (2006.01) | |
| G06F 3/01 | (2006.01) | |
| G03B 21/14 | (2006.01) | |

(52) U.S. Cl.
CPC .......... *G06T 3/4053* (2013.01); *G03B 21/142* (2013.01); *G06F 3/013* (2013.01)

(58) Field of Classification Search
CPC ..... G06T 19/006; G06T 19/20; G06T 15/503; G06F 3/013
See application file for complete search history.

(56) References Cited

U.S. PATENT DOCUMENTS

| | | | |
|---|---|---|---|
| 931,683 A | 8/1909 | Cox | |
| 7,872,635 B2 | 1/2011 | Mitchell | |
| 7,973,834 B2 | 7/2011 | Yang | |
| 2016/0240013 A1* | 8/2016 | Spitzer | G06F 3/013 |
| 2016/0342840 A1* | 11/2016 | Mullins | G06K 9/00671 |

OTHER PUBLICATIONS

Anjul Patney et al. "Perceptually-Based Foveated Virtual Reality," Retrieved at https://research.nvidia.com/publication/perceptually-based-foveated-virtual-reality, Jul. 2016, 2 pages.

* cited by examiner

*Primary Examiner* — Michael Faragalla
(74) *Attorney, Agent, or Firm* — Ziegler IP Law Group, LLC

(57) ABSTRACT

Disclosed is a display apparatus and a method of displaying, via the display apparatus. The display apparatus comprises at least one context display for rendering a context image, the at least one context display comprising at least one projection surface, and at least one focus image projector for rendering a focus image. An angular width of a projection of the rendered context image ranges from 40 degrees to 220 degrees. An angular width of a projection of the rendered focus image ranges from 5 degrees to 60 degrees. An arrangement is made to combine the projection of the rendered focus image with the projection of the rendered context image to create a visual scene.

18 Claims, 4 Drawing Sheets

DISPLAY APPARATUS AND METHOD OF DISPLAYING USING CONTEXT DISPLAY AND PROJECTORS

TECHNICAL FIELD

The present disclosure relates generally to representation of visual information; and more specifically, to display apparatuses comprising context displays, and focus image projectors. Furthermore, the present disclosure also relates to methods of displaying, via the aforementioned display apparatuses.

BACKGROUND

In recent times, there has been a rapid increase in use of modern technologies such as virtual reality, augmented reality, and so forth, in day to day lives of people. For example, such technologies may be used for applications such as gaming, education, military training, healthcare surgery training, and so forth. Specifically, such technologies present a simulated environment (often known as 'virtual world') to a user of a device. The simulated environment is presented by rendering images constituting the simulated environment on displays within the device. Examples of such devices include, but are not limited to, head mounted virtual reality devices, virtual reality glasses, and augmented reality headset. Such devices are adapted to present to the user, a feeling of immersion in the simulated environment using contemporary techniques such as stereoscopy.

However, such existing devices have certain limitations. In an example, conventional displays used in such devices are of small size. Specifically, pixel densities offered by such displays are insufficient to imitate visual acuity of eyes of humans. Further, displays offering higher pixel densities are dimensionally too large to be accommodated in such devices. In another example, displays used in existing devices require a large number of optical components to properly render the simulated environment along with implementation of gaze contingency as in the human visual system. Specifically, size and number of such optical components are difficult to accommodate in such devices. Consequently, such existing devices are not sufficiently well developed and are limited in their ability to mimic the human visual system.

Therefore, in light of the foregoing discussion, there exists a need to overcome the aforementioned drawbacks associated with conventional displays used in devices for implementing simulated environments.

SUMMARY

The present disclosure seeks to provide a display apparatus. The present disclosure also seeks to provide a method of displaying, via a display apparatus comprising at least one context display, and at least one focus image projector, the at least one context display comprising at least one projection surface. The present disclosure seeks to provide a solution to the existing problem of pixel density and physical size tradeoffs, and image discontinuities within conventional displays used in devices for implementing simulated environments. An aim of the present disclosure is to provide a solution that overcomes at least partially the problems encountered in prior art, and provides a display apparatus that closely mimics the human visual system.

In one aspect, an embodiment of the present disclosure provides a display apparatus comprising:
  at least one context display for rendering a context image, wherein an angular width of a projection of the rendered context image ranges from 40 degrees to 220 degrees, the at least one context display comprising at least one projection surface; and
  at least one focus image projector for rendering a focus image, wherein an angular width of a projection of the rendered focus image ranges from 5 degrees to 60 degrees;
wherein an arrangement is made to combine the projection of the rendered focus image with the projection of the rendered context image to create a visual scene.

In another aspect, an embodiment of the present disclosure provides a method of displaying, via a display apparatus comprising at least one context display, and at least one focus image projector, the at least one context display comprising at least one projection surface, the method comprising:
  (i) rendering a context image via the at least one context display, wherein an angular width of a projection of the rendered context image ranges from 40 degrees to 220 degrees;
  (ii) rendering a focus image via the at least one focus image projector, wherein an angular width of a projection of the rendered focus image ranges from 5 degrees to 60 degrees; and
  (iii) arranging for the projection of the rendered focus image to be combined with the projection of the rendered context image to create a visual scene.

Embodiments of the present disclosure substantially eliminate or at least partially address the aforementioned problems in the prior art, and enables implementation of active foveation within a display apparatus used in devices for implementing simulated environments, to mimic the human visual system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
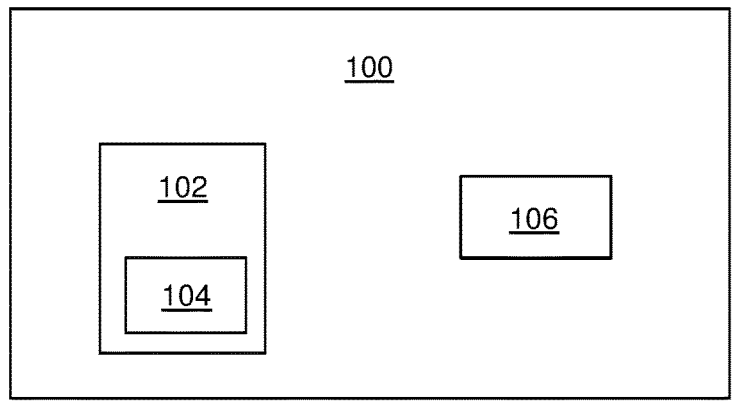
FIGS. 1-2 are block diagrams of exemplary architectures of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:

at least one context display for rendering a context image, wherein an angular width of a projection of the rendered context image ranges from 40 degrees to 220 degrees, the at least one context display comprising at least one projection surface; and at least one focus image projector for rendering a focus image, wherein an angular width of a projection of the rendered focus image ranges from 5 degrees to 60 degrees;

wherein an arrangement is made to combine the projection of the rendered focus image with the projection of the rendered context image to create a visual scene.

In another aspect, an embodiment of the present disclosure provides a method of displaying, via a display apparatus comprising at least one context display, and at least one focus image projector, the at least one context display comprising at least one projection surface, the method comprising:

(i) rendering a context image via the at least one context display, wherein an angular width of a projection of the rendered context image ranges from 40 degrees to 220 degrees;

(ii) rendering a focus image via the at least one focus image projector, wherein an angular width of a projection of the rendered focus image ranges from 5 degrees to 60 degrees; and (iii) arranging for the projection of the rendered focus image to be combined with the projection of the rendered context image to create a visual scene.

The present disclosure provides a display apparatus and a method of displaying via the display apparatus using context displays and projectors. The display apparatus described herein is not limited in operation by size and number of optical components to render the simulated environment. Therefore, the display apparatus may be easily implemented in small-sized devices such as virtual reality devices. Further, the display apparatus simulates active foveation of the human visual system by detecting gaze direction of the eyes of the user of the device. Furthermore, the displayed images using the described display apparatus are continuous due to proper minimisation of transitional area seams between the rendered context image and the rendered focus image. Therefore, the described display apparatus is operable to closely imitate gaze contingency similar to the human visual system. The method of displaying using the described display apparatus is easy to implement, and possesses robust active foveation capability. In the method described herein, the context and the focus images are rendered at almost an equal distance from the eyes of the user, thereby, reducing strain on the eyes Further, the display apparatus is inexpensive due presence of few optical components, and easy to manufacture.

The display apparatus comprises at least one context display for rendering a context image, the at least one context display comprising at least one projection surface, and at least one focus image projector for rendering a focus image. An angular width of a projection of the rendered context image ranges from 40 degrees to 220 degrees. An angular width of a projection of the rendered focus image ranges from 5 degrees to 60 degrees. Further, in the display apparatus, an arrangement is made to combine the projection of the rendered focus image with the projection of the rendered context image to create a visual scene.

Optionally, the angular width of the projection of the rendered context image may be greater than 220 degrees. In such instance, angular dimensions of the context display for rendering the context image may be larger than 220 degrees. According to an embodiment, the angular width of a projection of the rendered context image may be for example from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees. According to another embodiment the angular width of a projection of the rendered focus image may be for example from 5, 10, 15, 20, 25, 30, 35, 40, 45 or 50 degrees up to 15, 20, 25, 30, 35, 40, 45, 50, 55 or 60 degrees.

In an embodiment, the visual scene may be a scene such as a coffee shop environment, haunted house, a forest scene, and so forth, within a simulated environment to be presented to a user of a device, such as a head-mounted virtual reality device, virtual reality glasses, augmented reality headset, and so forth. More specifically, the visual scene may be projected onto eyes of the user when the device is used by the user. In such instance, the device may comprise the display apparatus. Further, the aforementioned arrangement of the at least one context display comprising the at least one projection surface, and the at least one focus image projector facilitates proper combination of the projections of the rendered context and focus images. If such combination is less than optimal (or improper), the visual scene created may appear distorted.

In an embodiment, the context image relates to an image of the visual scene, to be rendered and displayed via the display apparatus within the aforementioned angular width, to cope with saccades associated with movement of the eyes of the user. In another embodiment, the focus image relates to an image, to be rendered and projected via the display apparatus, within the aforementioned angular width to cope with saccadic movements associated with the eyes of the user. Specifically, the focus image is dimensionally smaller than the context image. Further, the context and focus images collectively constitute the visual scene upon combination of projections thereof.

In an embodiment, the term 'context display' used herein relates to a display (or screen) adapted to facilitate rendering of the context image thereon. Specifically, the at least one context display may be used for provisioning a context area for rendering the context image. According to an embodiment, the context display may be selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

In another embodiment, the at least one context display may comprise at least two context displays, at least one of the at least two context displays being arranged to be used for a left eye of the user, and at least one of the at least two context displays being arranged to be used for a right eye of the user. Specifically, the at least two context displays may be used such that at least one context display may be dedicatedly used to render a separate context image for each eye of the user. More specifically, the separate context images for the left eye and the right eye of the user may collectively constitute the context image.

In yet another embodiment, the at least one context display may be used for both eyes of the user on a shared basis. Specifically, in such embodiment, the at least one context display may be used to render separate context images for both the left eye, and the right eye of the user, on a shared basis.

As described previously, the at least one context display comprises the at least one projection surface. In an embodiment, the term 'projection surface' used herein relates to a display (or screen) adapted to facilitate rendering of the focus image thereon. Specifically, the at least one projection surface may have transmittance and reflectance specifications suitable for receiving a projection of the focus image to render the focus image thereon. In another embodiment, the focus image may be projected onto the at least one projection surface from either or both of, a front side of the projection surface, and a back side of the at least one projection surface.

In an example, the at least one projection surface may comprise at least two projection surfaces, at least one of the at least two projection surfaces being arranged to be used for the left eye of the user, and at least one of the at least two projection surfaces being arranged to be used for the right eye of the user. Specifically, the at least two projection surfaces may be used such that at least one projection surface may be dedicatedly used to render a separate focus image for each eye of the user. More specifically, the separate focus images for the left eye and the right eye of the user may collectively constitute the focus image.

In yet another embodiment, the at least one projection surface may be used for both eyes of the user on a shared basis. Specifically, in such embodiment, the at least one projection surface may be used to render separate focus images for both the left eye, and the right eye of the user, on a shared basis.

According to an embodiment, the term 'focus image projector' used herein relates to an optical device for projecting the focus image at the at least one projection surface. According to an embodiment, the focus image projector may be selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

In an embodiment of the present disclosure, the at least one focus image projector may comprise at least two focus image projectors, at least one of the at least two focus image projectors being arranged to be used for a left eye of a user, and at least one of the at least two focus image projectors being arranged to be used for a right eye of the user. Specifically, the at least two focus image projectors may be used such that at least one focus image projector may be dedicatedly (or wholly) used to render the focus image for one eye of the user. The at least two focus image projectors allow separate optimization of optical paths of the separate focus images (for example, a focus image for the left eye of the user and a focus image for the right eye of the user) collectively constituting the focus image.

For example, if the at least one focus image projector is a laser projector, one focus image projector may be arranged to be used for both eyes of the user. Specifically, the one laser projector may be operated such that the separate focus images for the both eyes of the user may be projected substantially simultaneously. For example, the one laser projector may be used as the at least one focus image projector to project separate focus images (for both the left eye of the user and the right eye of the user) due to fast speed of operation thereof.

In an embodiment, the display apparatus may further comprise an image steering unit, means for detecting a gaze direction, and a processor coupled in communication with the image steering unit and the means for detecting the gaze direction.

In an embodiment, the processor may be hardware, software, firmware or a combination of these, configured to controlling operation of the display apparatus. Specifically, the processor may control operation of the display apparatus to process and display (or project) the visual scene onto the eyes of the user. In an instance wherein the display apparatus is used within the device associated with the user, the processor may or may not be external to the device.

Optionally, the processor may also be coupled in communication with a memory unit. In an embodiment, the memory unit may be hardware, software, firmware or a combination of these, suitable for storing an image of the visual scene and/or the context and focus images to be processed by the processor for displayed via the display apparatus. In such embodiment, the memory unit may be used within the device or may be remotely located.

In an embodiment, the means for detecting a gaze direction may relate to specialized equipment for measuring a direction of gaze of the eyes of the user and detecting movement of the eyes, such as eye trackers. Specifically, an accurate detection of the gaze direction may allow the display apparatus to closely implement gaze contingency thereon. Further, the means for detecting the gaze direction may/may not be placed in contact with the eyes. Examples of the means for detecting a gaze direction include contact lenses with motion sensors, cameras monitoring position of pupil of the eye, and so forth.

In an embodiment, the processor may be configured to receive an input image, and use the detected gaze direction to determine a region of visual accuracy of the input image. According to an embodiment, the term 'input image' used herein relates to the image of the visual scene to be displayed via the display apparatus. Specifically, the input image may be displayed to the eyes of the user. In an embodiment, the input image may be received from an image sensor coupled to the device associated with the user. Specifically, the image sensor (such as image sensor of a pass-through digital camera) may capture an image of a real-world environment as the input image to be projected onto the eyes. In another embodiment, the input image may be received from the memory unit coupled in communication with the processor. Specifically, the memory unit may be configured to store the input image in a suitable format including, but not limited to, Motion Picture Experts Group (MPEG), Joint Photographic Experts Group (JPEG), Tagged Image File Format (TIFF), Portable Network Graphics (PNG), Graphics Interchange Format (GIF), and Bitmap file format (BMP). In such embodiment, the input image may optionally be a computer generated image.

In the aforementioned embodiment, along with receiving the input image, the processor may use the detected gaze direction to determine the region of visual accuracy of the input image. In an embodiment, the region of visual accuracy relates to a region of the input image whereat the detected gaze direction of the eyes of the user may be focused. Specifically, the region of visual accuracy may be a region of interest (or a fixation point) within the input image, and may be projected onto fovea of both the eyes of the user. Further, the region of visual accuracy may be the region of focus within the input image. Therefore, it may be evident that the region of visual accuracy relates to a region resolved to a much greater detail as compared to other regions of the input image, when the input image is viewed by a human visual system.

Further, in the aforementioned embodiment, after determining the region of visual accuracy of the input image, the processor may be configured to process the input image to generate the context image and the focus image, the context image having a first resolution and the focus image having a second resolution. The second resolution is higher than the first resolution. The focus image substantially corresponds to the region of visual accuracy of the input image. Further, the context image corresponds to a low-resolution representation of the input image. Therefore, the context image includes the region of visual accuracy of the input image along with remaining region of the input image. Specifically, size of the context image is larger than size of the focus image since the focus image corresponds to only a portion of the context image whereat the detected gaze direction of the eye may be focused.

In an embodiment, the first and second resolutions may be understood in terms of angular resolution. Specifically, pixels per degree indicative of the second resolution is higher than pixels per degree indicative of the first resolution. In an example, fovea of the eye of the user corresponds to 2 degrees of visual field and receives the projection of the focus image of angular cross section width equal to 114 pixels indicative of 57 pixels per degree. Therefore, an angular pixel size corresponding to the focus image would equal 2/114 or 0.017. Further in such example, the retina of the eye corresponds to 180 degrees of visual field and receives projection of the context image of angular cross section width equal to 2700 pixels indicative of 15 pixels per degree. Therefore, an angular pixel size corresponding to the context image would equal 180/2700 or 0.067. As calculated, the angular pixel size corresponding to the context image is clearly much larger than the angular pixel size corresponding to the focus image. However, a perceived angular resolution indicated by a total number of pixels may be greater for the context image as compared to the focus image since the focus image corresponds to only a part of the context image, wherein the part corresponds to the region of visual accuracy of the input image.

In the aforementioned embodiment, along with the generation of the context image and the focus image, a region of the context image that substantially corresponds to the region of visual accuracy of the input image is masked. Specifically, the masking may be performed by the processor to hide (or obscure) the region of the context image corresponding to the region of visual accuracy of the input image. More specifically, masking the region of the context image that substantially corresponds to the region of visual accuracy of the input image relates to modifying content (specifically, the context image) rendered on the at least one context display such that luminance and/or chrominance characteristics of the at least one projection surface remains unaltered. For example, pixels of the context image corresponding to the region of visual accuracy of the input image may be dimmed (or blackened) for masking.

Further, in the aforementioned embodiment, the processor is configured to render the context image at the at least one context display, and render the focus image at the at least one projection surface via the at least one focus image projector.

Furthermore, in the aforementioned embodiment, the processor is configured to control the image steering unit to adjust a location of the projection of the rendered focus image on the at least one projection surface, such that the projection of the rendered focus image substantially overlaps the projection of the masked region of the rendered context image. The processor is configured to perform rendering of the context and focus images, and controlling the image steering unit substantially simultaneously. Specifically, the overlapping projection of the focus image on the projection of the rendered context image may collectively constitute a projection of the input image. The context and focus images are rendered substantially simultaneously in order to avoid time lag during overlap (or superimposition) of projections thereof.

As described previously, the angular width of the projection of the rendered context image is larger than the angular width of the projection of the rendered focus image. This may be attributed to the fact that the rendered focus image is typically projected on and around the fovea of the eye, whereas the rendered context image is projected on a retina of the eye, of which the fovea is just a small part. Specifically, a combination of the rendered context and focus images constitute the input image and may be projected onto the eye to project the input image thereon.

In an embodiment, the term 'image steering unit' used herein relates to equipment (such as optical elements, electromechanical components, and so forth) for controlling the location of the projection of the rendered focus image on the at least one projection surface. Specifically, the image steering unit may include at least one element/component. Optionally, the image steering unit may also be operable to control the projection of the context image rendered at the at least one context display.

In the aforementioned embodiment, the image steering unit substantially overlaps the projection of the rendered focus image with the projection of the masked region of the rendered context image to avoid distortion of the region of visual accuracy of the input image. Specifically, the region of visual accuracy of the input image is represented within both, the rendered context image of low resolution and the rendered focus image of high resolution. The overlap (or superimposition) of projections of low and high-resolution images of a same region results in distortion of appearance of the same region. Further, the rendered focus image of high resolution may contain more information pertaining to the region of visual accuracy of the input image, as compared to the rendered context image of low resolution. Therefore, the region of the context image that substantially corresponds to the region of visual accuracy of the input image is masked, in order to project the rendered high-resolution focus image without distortion.

As described in an embodiment previously, the processor may be configured to mask the region of the context image corresponding to the region of visual accuracy of the input image. Specifically, the masking may be performed such that transitional area seams (or edges) between the region of visual accuracy of the displayed input image and remaining region of the displayed input image are minimum. It is to be understood that the region of visual accuracy of the displayed input image corresponds to the projection of the focus image (and the masked region of the context image) whereas the remaining region of the displayed input image corresponds to the projection of the context image. Specifically, the masking should be performed as a gradual gradation in order to minimize the transitional area seams upon overlapping (or superimposition) of the projections of context and focus images so that the displayed input image appears continuous. For example, the processor may significantly dim pixels of the context image corresponding to the region of visual accuracy of the input image, and gradually reduce the amount of dimming of the pixels with increase in distance thereof from the region of visual accuracy of the input image. If alignment and appearance of the superimposed (or overlapping) projections of the rendered context and focus images are improper and/or have discontinuities, then the displayed input image would also be improper.

Optionally, masking the region of the context image that substantially corresponds to the region of visual accuracy of the input image may be performed using linear transparency mask blend of inverse values between the context image and the focus image at the transition area, stealth (or camouflage) patterns containing shapes naturally difficult for detection by the eyes of the user, and so forth.

According to an embodiment, the at least one context display may comprise a multi-layered structure, and wherein the at least one projection surface is implemented by way of at least one layer of the multi-layered structure. Specifically, the at least one layer used for implementing the at least one projection surface may be mechanically bonded and/or electrically coupled to other layers of the multi-layered structure of the at least one context display. More specifically, the at least one layer used for implementing the at least one projection surface may have specific transmittance and reflectance specifications to facilitate rendering of the focus image thereon. Such specific transmittance and reflectance specifications may depend on a side (such as the front side and/or the back side) of projection of the focus image as described herein below. In an example, the at least one projection surface may be a non-transparent (or opaque) surface. In another example, the at least one projection surface may be a semi-transparent surface.

In an embodiment, the focus image may be projected onto the at least one layer of the at least one projection surface from the front side thereof. In such instance, the at least one layer for implementing the at least one projection surface may be arranged to reflect the projection of the focus image substantially. In another embodiment, the focus image may be projected onto the at least one layer of the at least one projection surface from the back side thereof. In such instance, the at least one layer for implementing the at least one projection surface may be arranged to allow the projection of the focus image to pass through substantially. In yet another embodiment, the focus image may be projected onto the at least one layer of the at least one projection surface from both the front and the back sides thereof. In such instance, the at least one layer for implementing the at least one projection surface may be arranged to partially reflect the projection of the focus image and to partially allow the projection of the focus image to pass therethrough. Optionally, the at least one layer for implementing the at least one projection surface may be arranged to at least partially absorb the projection of the focus image.

Optionally, the multi-layered structure of the at least one context display may comprise layers such as, but not limited to, colour filters, encapsulation glass, backplanes built on substrates (such as glass, polyimide, and so forth), protection films, and top and/or bottom polarizers. Specifically, characteristics (or properties) of such layers may be adjustable and may facilitate better projection of the focus image on the at least one projection surface of the at least one context display.

According to an embodiment, the at least one projection surface may be arranged to allow the projection of the rendered context image to pass through substantially. According to another embodiment, the at least one projection surface may be arranged to reflect the projection of the rendered context image substantially.

In an embodiment, the at least one projection surface may be implemented by way of an optical coating on a front side of the at least one context display or on a back side of the at least one context display. Specifically, the optical coating may be utilized to achieve the specific transmittance and reflectance specifications suitable for rendering the focus image thereon. More specifically, such specific transmittance and reflectance specifications of the optical coating may depend on the side of the at least one context display whereat the optical coating is implemented. In an example, the optical coating may reflect the projection of the focus image substantially when implemented on the front side of the at least one context display. In another example, the optical coating may allow the projection of the focus image to pass through substantially when implemented on the back side of the at least one context display. Optionally, the optical coating may also be implemented on a top side of the at least one context display.

In another embodiment, the at least one projection surface may be implemented by way of a polarizer or a retarder. Specifically, inherent properties of optical devices such as the polarizer or the retarder may facilitate use thereof for rendering the focus image on the at least one projection surface. For example, the at least one projection surface may be implemented by way of an absorptive linear polarizer. In such example, the absorptive linear polarizer may have an inherent property of substantially reflecting the projection of the rendered focus image, when direction of polarization of the projection of the focus image from the at least one focus image projector, corresponds to direction of polarization of the absorptive linear polarizer. Further, in such example, the absorptive linear polarizer may have another inherent property of absorbing projection of the rendered focus image, when direction of polarization of the projection of the focus image from the at least one focus image projector, does not correspond to direction of polarization of the absorptive linear polarizer.

According to an embodiment of the present disclosure, the at least one context display may comprise a layer having a pixel layout that allows the projection of the rendered focus image to pass through substantially. Specifically, the pixel layout may be a grid-like arrangement of pixels of the at least one context display. In an embodiment, the pixel layout may comprise a plurality of pixels that are arranged in a manner that semi-transparent regions are formed between neighboring pixels. Specifically, the plurality of pixels may be sparsely dispersed within the grid-like arrangement and may have significant separation between the neighboring pixels. The separation between the neighboring pixels constitutes the semi-transparent regions therebetween. Therefore, the layer of the at least one context display having the aforementioned pixel layout has low pixel resolution (or low pixel density). Further, the aforementioned layer allows the projection of the rendered focus image to substantially pass therethrough. Specifically, the processor may process the focus image such that the projection of high resolution focus image may be projected through the layer, when projected onto a back side the layer. More specifically, the high resolution back-projected focus image may be displayed on top of the pixel layout using optical elements such as microlenses, microprisms, and so forth.

In one embodiment, the at least one context display comprises at least one layer having optical waveguides for allowing the projection of the rendered focus image to pass through substantially. Specifically, the optical waveguide may be semi-transparent, thereby allowing the projection of the focus image to pass therethrough. Optionally, the at least one layer having optical waveguides may be positioned on an optical path between the at least one projection surface and the at least one focus image projector. In an embodiment, the optical waveguide may further comprise optical elements therein such as microprisms, microlenses, mirrors, diffractive optics, and so forth.

In an embodiment, the image steering unit may comprise at least one first actuator for moving the focus image projector with respect to the at least one projection surface, wherein the processor is configured to control the at least one first actuator to adjust the location of the projection of the rendered focus image on the at least one projection surface. Specifically, the at least one first actuator may move the at least one focus image projector when the gaze direction of the eye shifts from one direction to another. In such instance, the arrangement of the at least one focus image projector and the at least one projection surface may not optimally project the rendered focus image on and around the fovea of the eye. Therefore, the processor may control the at least one first actuator to move the at least one focus image projector with respect to the at least one projection surface, to adjust the location of the projection of the rendered focus image on the at least one projection surface such that the rendered focus image may be projected on and around the fovea of the eye even on occurrence of shift in the gaze direction. More specifically, the processor may control the at least one first actuator by generating an actuation signal (such as an electric current, hydraulic pressure, and so forth).

In an example, the at least one first actuator may move the at least one focus image projector closer or away from the at least one projection surface. In another example, the at least one first actuator may move the at least one focus image projector laterally with respect to the at least one projection surface. In yet another example, the at least one first actuator may tilt and/or rotate the at least one focus image projector with respect to the at least one projection surface.

According to an embodiment, the image steering unit may comprise at least one optical element that is positioned on an optical path between the at least one projection surface and the at least one focus image projector, and at least one second actuator for moving the at least one optical element with respect to the at least one focus image projector. The at least one optical element may be selected from the group consisting of a lens, a prism, a mirror, and a beam splitter. Further, in such embodiment, the processor is configured to control the at least one second actuator to adjust the location of the projection of the rendered focus image on the at least one projection surface. Specifically, the at least one optical element may change the optical path of the projection of the rendered focus image on the at least one projection surface in order to facilitate projection of the rendered focus image on and around the fovea of the eye even on occurrence of shift in the gaze direction. More specifically, the processor may control the at least one second actuator by generating an actuation signal (such as an electric current, hydraulic pressure, and so forth).

For example, a prism may be positioned on an optical path between a projection surface and a focus image projector. Specifically, an optical path of a projection of a rendered focus image may change on passing through the prism to adjust a location of the projection of the rendered focus image on the projection surface. Further, the prism may be moved transversally and/or laterally, be rotated, be tilted, and so forth, by a second actuator in order to facilitate projection of the rendered focus image on and around fovea of the eye even on occurrence of shift in the gaze direction of the user.

In an embodiment, an electronically controlled optical assembly, such as one or more LC lenses positioned on the optical path between the at least one projection surface and the at least one focus image projector, may be used to adjust the location of the projection of the rendered focus image on the at least one projection surface.

According to another embodiment, the image steering unit may comprise at least one third actuator for moving the at least one projection surface, wherein the processor is configured to control the at least one third actuator to adjust the location of the projection of the rendered focus image on the at least one projection surface. Specifically, the at least one third actuator may move the at least one projection surface in order to facilitate projection of the rendered focus image on and around the fovea of the eye even on occurrence of shift in the gaze direction. More specifically, the processor may control the at least one third actuator by generating an actuation signal (such as an electric current, hydraulic pressure, and so forth).

In an example, the at least one third actuator may move the at least one projection surface closer or away from the at least one focus image projector. In another example, the at least one third actuator may move the at least one projection surface laterally with respect to the at least one focus image projector. In yet another example, the at least one third actuator may tilt and/or rotate the at least one projection surface.

In an embodiment, the display apparatus may comprise at least one focusing lens that is positioned on an optical path between the at least one projection surface and the at least one focus image projector and at least one fourth actuator for moving the at least one focusing lens with respect to the at least one focus image projector. In such embodiment, the processor is configured to control the at least one fourth actuator to adjust a focus of the projection of the rendered focus image. Specifically, the at least one focusing lens may utilize specialized properties thereof to adjust the focus of the projection of the rendered focus image by changing the optical path thereof. More specifically, the focus of the projection of the rendered focus image may be adjusted to accommodate for diopter tuning, astigmatism correction, and so forth. Further, the processor may control the at least one fourth actuator by generating an actuation signal (such as an electric current, hydraulic pressure, and so forth).

In an embodiment, the at least one focusing lens may comprise a Liquid Crystal lens (LC lens) or other electronically controlled optical element.

In an embodiment, the processor may implement image processing functions for the at least one projection surface. Specifically, the image processing functions may be implemented prior to rendering the context image at the at least one context display and rendering the focus image at the at least one projection surface. More specifically, implementation of such image processing functions may optimize quality of the rendered context and focus images. Therefore, the image processing function may be selected by taking into account properties of the at least one projection surface, the at least one context display, and the properties of the input image.

According to an embodiment, image processing functions for the at least one projection surface may comprise at least one function for optimizing perceived context image and/or the focus image quality, the at least one function selected from the group comprising low pass filtering, colour processing, and gamma correction. In an embodiment, the image processing functions for the at least one projection surface may further comprise edge processing to minimize perceived distortion on a boundary of combined projections of the rendered context and focus images.

Optionally, the aforementioned display apparatus may be used to receive another input image, process the another input image to generate another focus and context images, and render the another focus and context images whilst arranging for the projection of the rendered another focus and context images to be combined to create the visual scene. In an example, the another input image may be received from a video camera of a head-mounted virtual reality device associated with the user.

DETAILED DESCRIPTION OF THE DRAWINGS

Referring to FIG. 1, illustrated is a block diagram of an exemplary architecture of a display apparatus 100, in accordance with an embodiment of the present disclosure. The display apparatus 100 includes at least one context display 102 for rendering a context image, the at least one context display 102 including at least one projection surface 104, and at least one focus image projector 106 for rendering a focus image. An arrangement is made to combine the projection of the rendered focus image with the projection of the rendered context image to create a visual scene.

Figure 2:
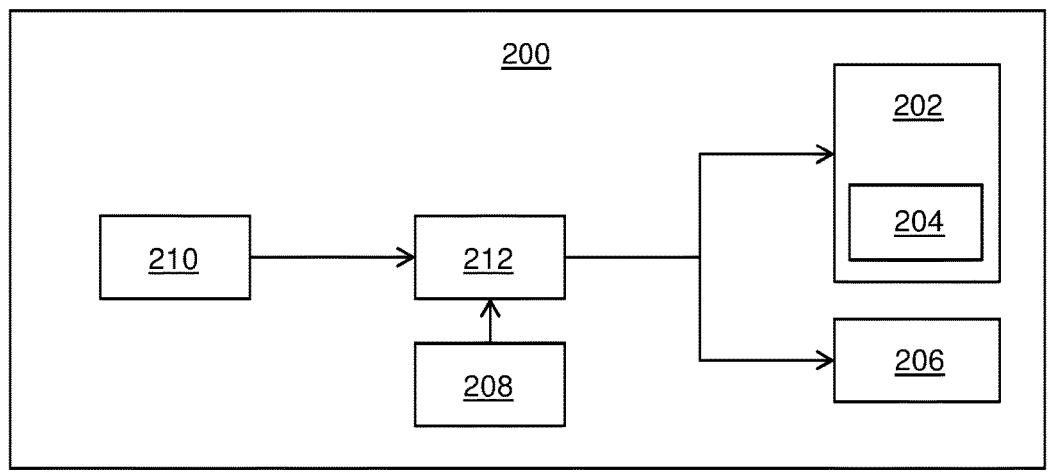

Referring to FIG. 2, illustrated is a block diagram of an exemplary architecture of a display apparatus 200, in accordance with another embodiment of the present disclosure. The display apparatus 200 includes at least one context display 202 for rendering a context image, the at least one context display 202 including at least one projection surface 204, at least one focus image projector 206 for rendering a focus image, an image steering unit 208, means for detecting a gaze direction 210, and a processor 212. The processor 212 is coupled in communication with the image steering unit 208 and the means for detecting the gaze direction 210. Further, the processor 212 is also coupled to the at least one context display 202, and the at least one focus image projector 206.

Figure 3:
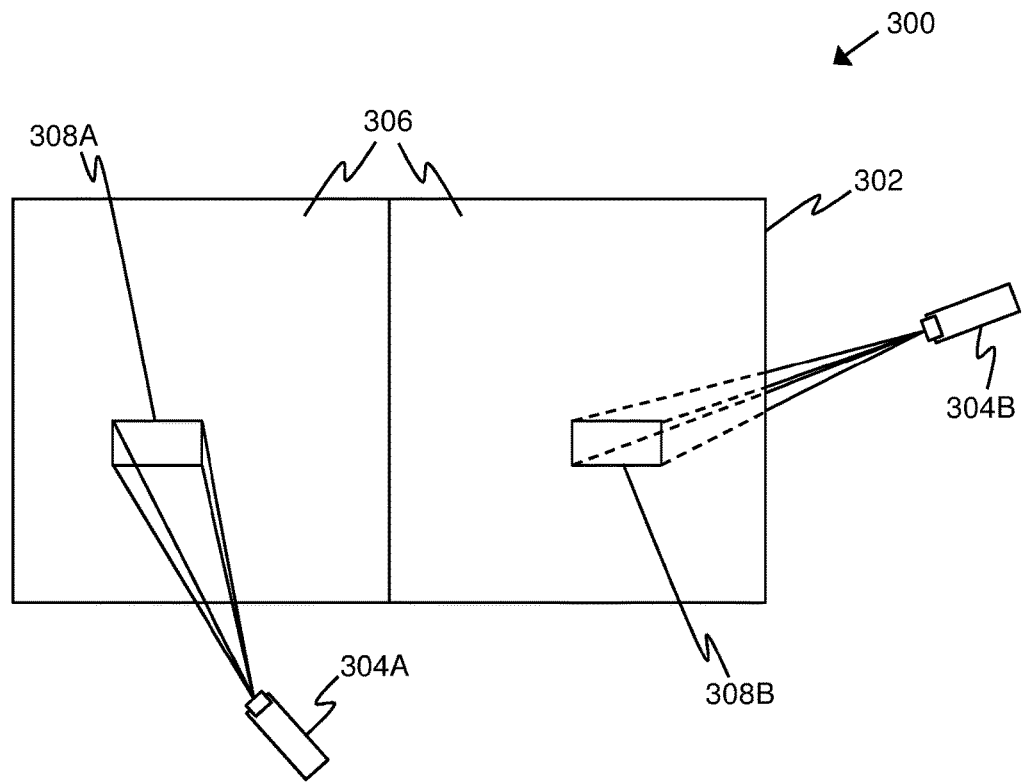
FIG. 3 is an exemplary implementation of the display apparatus, in accordance with an embodiment of the present disclosure.

Referring to FIG. 3, illustrated is an exemplary implementation of a display apparatus 300, in accordance with an embodiment of the present disclosure. As shown, the display apparatus 300 includes at least one context display (depicted as a context display 302), the at least one context display including at least one projection surface (not shown), at least one focus image projector comprising at least two focus image projectors (depicted as two focus image projectors 304A and 304B), means for detecting a gaze direction (not shown), a processor (not shown), and an image steering unit (not shown). The context display 302 depicted herein is used for both eyes of a user on a shared-basis. The processor of the display apparatus 300 is configured to render a context image 306 at the context display 302. Specifically, the context image 306 may be collectively constituted by separate context images for both eyes of the user. Further, the processor of the display apparatus 300 is configured to render a focus image (depicted as two focus images 308A and 308B) at the at least one projection surface (not shown) via the two focus image projectors 304A and 304B respectively. In such instance, the focus image 308A is used for the left eye of the user, and the focus image 308B is used for the right eye of the user. As shown, the focus image 308A is projected from a front side of the at least one projection surface and the focus image 308B is projected from a back side of the at least one projection surface included in the context display 302.

Figure 4:
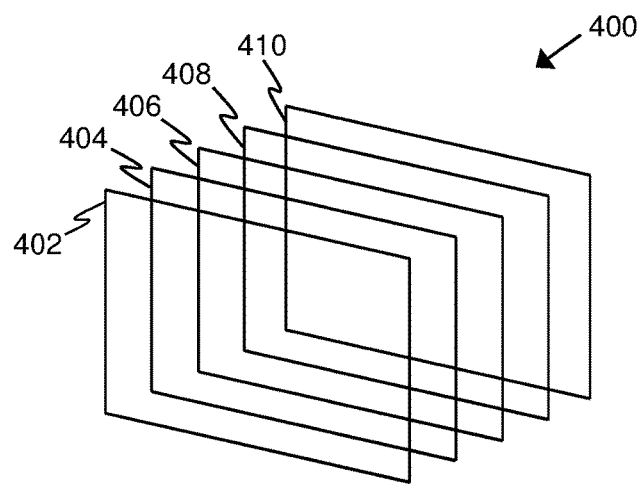
FIG. 4 is an exploded view of an exemplary context display, in accordance with an embodiment of the present disclosure.

Referring to FIG. 4, illustrated is an exploded view of an exemplary context display 400, in accordance with an embodiment of the present disclosure. As shown, the context display 400 comprises a multi-layered structure (depicted as layers 402, 404, 406, 408, and 410). Further, the layer 402 is arranged at a front side of the context display 400 and the layer 410 is arranged at a back side of the context display 400. The context display 400 includes at least one projection surface, such that the at least one projection surface is implemented by way of at least one layer (depicted as the layers 402 and 404) of the multi-layered structure. Specifically, the at least one projection surface is implemented by way of an optical coating on the layer 402, on the front side of the context display 400. Further, the at least one projection surface is implemented by way of a polarizer represented by the layer 404. The layer 406 represents a colour filter or an encapsulation glass. The layer 408 represents a backplane built on a substrate such as glass, polyimide, and so forth. Further, the layer 410 represents any of a bottom polarizer, a top polarizer, or a protection film. Optionally, the layer 402 may represent an optically clear hard coating which may be scratch resistant, thereby, protecting the context display 400. In such instance, the at least one projection surface is implemented only by layer 404 of the depicted exemplary context display 400.

Figure 5:
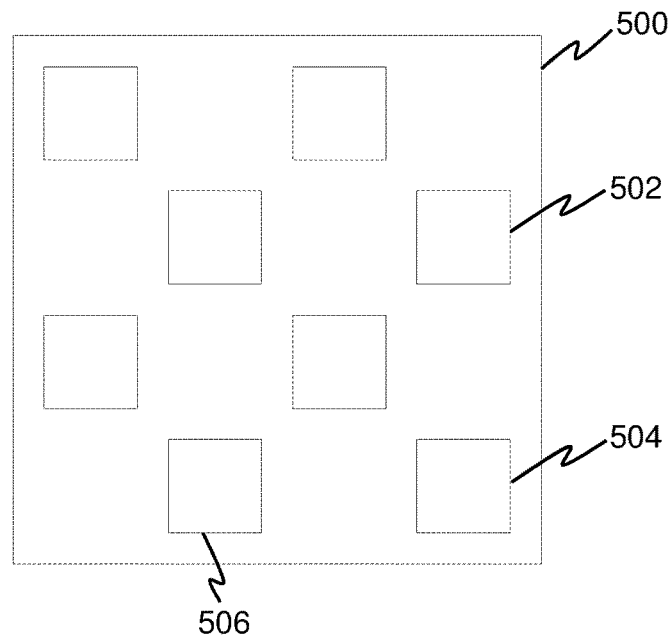
FIGS. 5-6 are schematic illustrations of a layer of an exemplary context display, in accordance with an embodiment of the present disclosure.

Referring to FIG. 5, illustrated is a schematic illustration of a layer 500 of an exemplary context display (such as the exemplary context display 400 of FIG. 4), in accordance with an embodiment of the present disclosure. As shown, the layer 500 has a pixel layout including a plurality of pixels depicted as 502, 504, and 506. Specifically, the pixel layout is a grid-like arrangement of the plurality of pixels 502, 504, and 506. Further, the plurality of pixels 502, 504, and 506 are arranged in a manner that semi-transparent regions are formed between neighboring pixels. Therefore, the layer 500 of the exemplary context display having the depicted pixel layout has low pixel resolution (or low pixel density).

Figure 6:
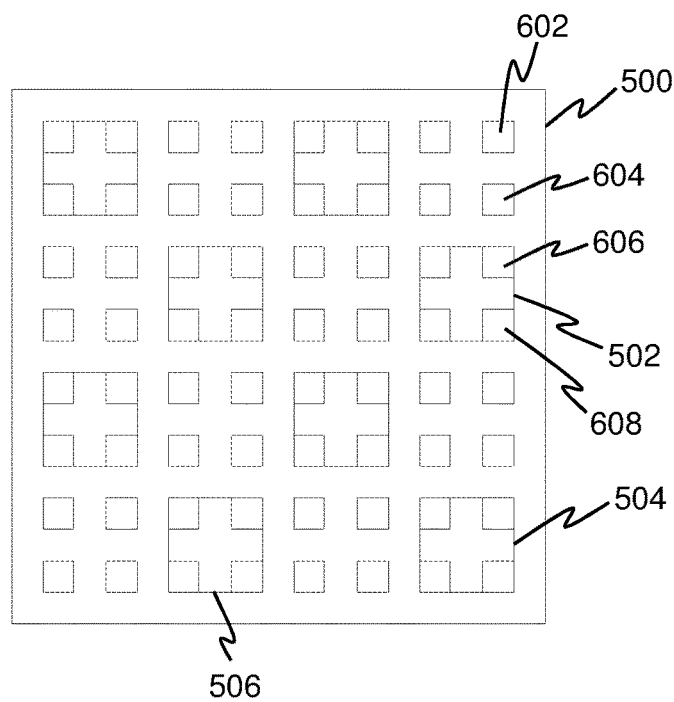

Referring to FIG. 6, illustrated is a schematic illustration of the layer 500 of the context display of FIG. 5, in accordance with an embodiment of the present disclosure. As shown, the layer 500 allows a projection of a rendered focus image to pass through substantially. Specifically, the focus image may be projected from a back and/or a front side of the layer 500. More specifically, the projection of the rendered focus image includes a plurality of pixels depicted as 602, 604, 606, and 608, such that the plurality of pixels have higher resolution (or higher pixel density) as compared to the plurality of pixels 502, 504, and 506 of the layer 500. Specifically, the plurality of pixels 602, 604, 606, and 608 are seen on top of the plurality of pixels 502, 504, and 506. In an example, the pixels 606 and 608 are seen on top of the pixel 502.

Figure 7:
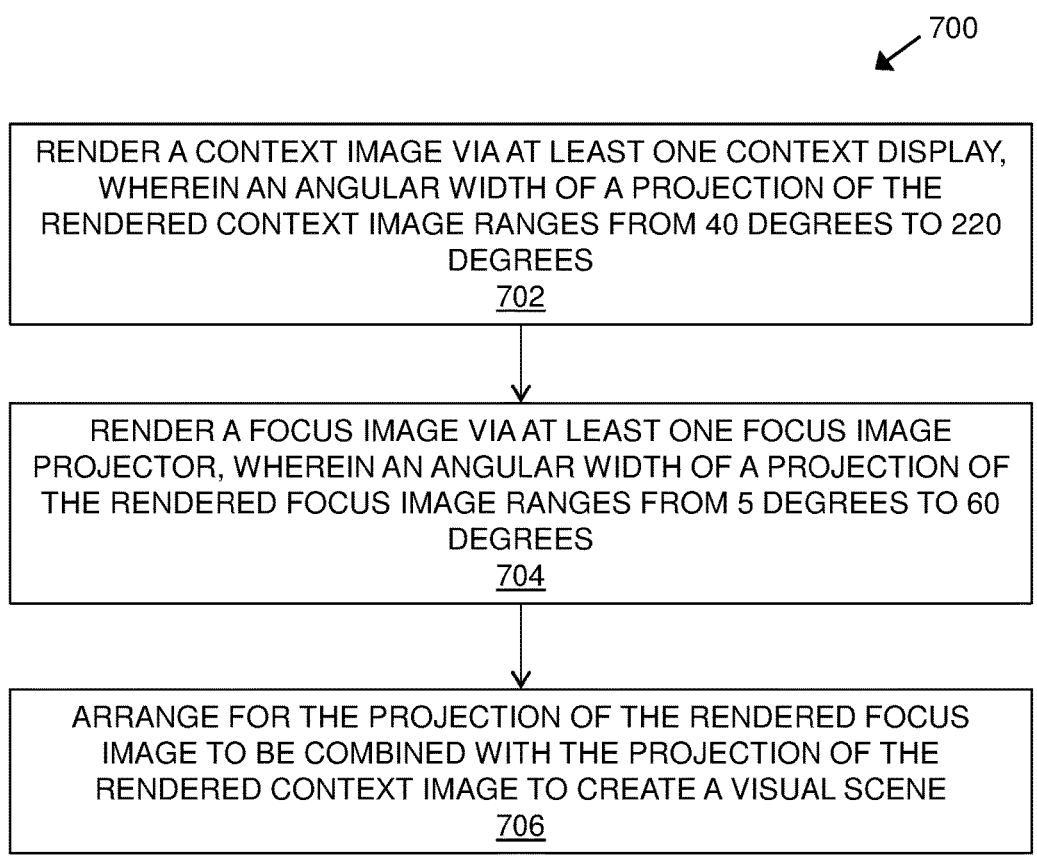
FIG. 7 illustrates steps of a method of displaying via a display apparatus, in accordance with an embodiment of the present disclosure.

Referring to FIG. 7, illustrated are steps of a method 700 of displaying via a display apparatus (such as the display apparatus 100 of FIG. 1), in accordance with an embodiment of the present disclosure. At step 702, a context image is rendered via at least one context display, wherein an angular width of a projection of the rendered context image ranges from 40 degrees to 220 degrees. At step 704, a focus image is rendered via at least one focus image projector, wherein an angular width of a projection of the rendered focus image ranges from 5 degrees to 60 degrees. At step 706, an arrangement is made for the projection of the rendered focus image to be combined with the projection of the rendered context image to create a visual scene.

The steps 702 to 706 are only illustrative and other alternatives can also be provided where one or more steps are added, one or more steps are removed, or one or more steps are provided in a different sequence without departing from the scope of the claims herein. In an example, the method 700 may further comprise detecting a gaze direction, and using the detected gaze direction to determine a region of visual accuracy of an input image, processing the input image to generate the context image and the focus image, the context image having a first resolution and the focus image having a second resolution, the second resolution being higher than the first resolution, and controlling the image steering unit to adjust a location of the projection of the rendered focus image on the at least one projection surface, such that the projection of the rendered focus image substantially overlaps the projection of the masked region of the rendered context image. The processing comprises masking a region of the context image that substantially corresponds to the region of visual accuracy of the input image and generating the focus image to substantially correspond to the region of visual accuracy of the input image. Further, rendering the focus and context images, and controlling the image steering unit are performed substantially simultaneously. Optionally, in the method 700, the location of the projection of the rendered focus image may be adjusted by controlling at least one first actuator of the image steering unit to move the focus image projector with respect to the at least one projection surface. More optionally, in the method 700, the location of the projection of the rendered focus image may be adjusted by controlling at least one second actuator of the image steering unit to move at least one optical element of the image steering unit with respect to the at least one focus image projector, wherein the at least one optical element is positioned on an optical path between the at least one projection surface and the at least one focus image projector. In an example, in the method 700, the location of the projection of the rendered focus image may be adjusted by controlling at least one third actuator of the image steering unit to move the at least one projection surface. In another example, the method 700 may further comprise adjusting a focus of the projection of the rendered focus image by controlling at least one fourth actuator of the display apparatus to move at least one focusing lens of the display apparatus with respect to the at least one focus image projector, wherein the at least one focusing lens is positioned on an optical path between the at least one projection surface and the at least one focus image projector.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
    at least one context display for rendering a context image, wherein an angular width of a projection of the rendered context image ranges from 40 degrees to 220 degrees, the at least one context display comprising at least one projection surface; and
    at least one focus image projector for rendering a focus image, wherein an angular width of a projection of the rendered focus image ranges from 5 degrees to 60 degrees;
    an image steering unit:
    means for detecting a gaze direction; and
    a processor coupled in communication with the image steering unit and the means for detecting the gaze direction, wherein the processor is configured to:
        (a) receive an input image, and use the detected gaze direction to determine a region of visual accuracy of the input image;
        (b) process the input image to generate the context image and the focus image, the context image having a first resolution and the focus image having a second resolution, wherein:
            a region of the context image that substantially corresponds to the region of visual accuracy of the input image is masked,
            the focus image substantially corresponds to the region of visual accuracy of the input image, and
            the second resolution is higher than the first resolution;
        (c) render the context image at the at least one context display;
        (d) render the focus image at the at least one projection surface via the at least one focus image projector; and
        (e) control the image steering unit to adjust a location of the projection of the rendered focus image on the at least one projection surface, such that the projection of the rendered focus image substantially overlaps the projection of the masked region of the rendered context image,
    wherein the processor is configured to perform (c), (d) and (e) substantially simultaneously, and
    an arrangement is made to combine the projection of the rendered focus image with the projection of the rendered context image to create a visual scene.

2. The display apparatus of claim 1, wherein the at least one context display comprises a multi-layered structure, and wherein the at least one projection surface is implemented by way of at least one layer of the multi-layered structure.

3. The display apparatus of claim 1, wherein the at least one projection surface is implemented by way of an optical coating on a front side of the at least one context display or on a back side of the at least one context display.

4. The display apparatus of claim 1, wherein the at least one projection surface is implemented by way of a polarizer or a retarder.

5. The display apparatus of claim 1, wherein the at least one context display comprises a layer having a pixel layout that allows the projection of the rendered focus image to pass through substantially.

6. The display apparatus of claim 5, wherein the pixel layout comprises a plurality of pixels that are arranged in a manner that semi-transparent regions are formed between neighboring pixels.

7. The display apparatus of claim 1, wherein the at least one context display comprises at least one layer having optical waveguides for allowing the projection of the rendered focus image to pass through substantially.

8. The display apparatus of claim 1, wherein the image steering unit comprises at least one first actuator for moving the focus image projector with respect to the at least one projection surface, wherein the processor is configured to control the at least one first actuator to adjust the location of the projection of the rendered focus image on the at least one projection surface.

9. The display apparatus of claim 1, wherein the image steering unit comprises:
   at least one optical element that is positioned on an optical path between the at least one projection surface and the at least one focus image projector, the at least one optical element being selected from the group consisting of a lens, a prism, a mirror, and a beam splitter; and
   at least one second actuator for moving the at least one optical element with respect to the at least one focus image projector,
wherein the processor is configured to control the at least one second actuator to adjust the location of the projection of the rendered focus image on the at least one projection surface.

10. The display apparatus of claim 1, wherein the image steering unit comprises at least one third actuator for moving the at least one projection surface, wherein the processor is configured to control the at least one third actuator to adjust the location of the projection of the rendered focus image on the at least one projection surface.

11. The display apparatus of claim 1, wherein the display apparatus comprises:
   at least one focusing lens that is positioned on an optical path between the at least one projection surface and the at least one focus image projector; and
   at least one fourth actuator for moving the at least one focusing lens with respect to the at least one focus image projector,
wherein the processor is configured to control the at least one fourth actuator to adjust a focus of the projection of the rendered focus image.

12. The display apparatus of claim 1, wherein the context display is selected from the group consisting of: a Liquid Crystal Display, a Light Emitting Diode-based display, an Organic Light Emitting Diode-based display, a micro Organic Light Emitting Diode-based display, and a Liquid Crystal on Silicon-based display.

13. The display apparatus of claim 1, wherein the focus image projector is selected from the group consisting of: a Liquid Crystal Display-based projector, a Light Emitting Diode-based projector, an Organic Light Emitting Diode-based projector, a Liquid Crystal on Silicon-based projector, a Digital Light Processing-based projector, and a laser projector.

14. A method of displaying, via a display apparatus comprising at least one context display, and at least one focus image projector, the at least one context display comprising at least one projection surface, the method comprising:
   (i) rendering a context image via the at least one context display, wherein an angular width of a projection of the rendered context image ranges from 40 degrees to 220 degrees;
   (ii) rendering a focus image via the at least one focus image projector, wherein an angular width of a projection of the rendered focus image ranges from 5 degrees to 60 degrees; and
   (iii) arranging for the projection of the rendered focus image to be combined with the projection of the rendered context image to create a visual scene;
wherein the display apparatus further comprises an image steering unit, means for detecting a gaze direction, and a processor coupled in communication with the image steering unit and the means for detecting the gaze direction, and wherein the method further comprises:
   (iv) detecting a gaze direction, and using the detected gaze direction to determine a region of visual accuracy of an input image;
   (v) processing the input image to generate the context image and the focus image, the context image having a first resolution and the focus image having a second resolution, the second resolution being higher than the first resolution, wherein the processing comprises:
      masking a region of the context image that substantially corresponds to the region of visual accuracy of the input image; and
      generating the focus image to substantially correspond to the region of visual accuracy of the input image; and
   (vi) controlling the image steering unit to adjust a location of the projection of the rendered focus image on the at least one projection surface, such that the projection of the rendered focus image substantially overlaps the projection of the masked region of the rendered context image,
wherein (i), (ii) and (vi) are performed substantially simultaneously.

15. The method of claim 14, wherein the location of the projection of the rendered focus image is adjusted by controlling at least one first actuator of the image steering unit to move the focus image projector with respect to the at least one projection surface.

16. The method of claim 14, wherein the location of the projection of the rendered focus image is adjusted by controlling at least one second actuator of the image steering unit to move at least one optical element of the image steering unit with respect to the at least one focus image projector, wherein the at least one optical element is positioned on an optical path between the at least one projection surface and the at least one focus image projector.

17. The method of claim 14, wherein the location of the projection of the rendered focus image is adjusted by controlling at least one third actuator of the image steering unit to move the at least one projection surface.

18. The method of claim 14, further comprising adjusting a focus of the projection of the rendered focus image by controlling at least one fourth actuator of the display apparatus to move at least one focusing lens of the display apparatus with respect to the at least one focus image projector, wherein the at least one focusing lens is positioned on an optical path between the at least one projection surface and the at least one focus image projector.

* * * * *